United States Patent
Hong

(10) Patent No.: US 10,784,798 B2
(45) Date of Patent: Sep. 22, 2020

(54) POWER CONVERTING APPARATUS AND HOME APPLIANCE INCLUDING THE SAME

(71) Applicant: LG ELECTRONICS INC., Seoul (KR)

(72) Inventor: Youngho Hong, Seoul (KR)

(73) Assignee: LG ELECTONICS INC., Seoul (KR)

( * ) Notice: Subject to any disclaimer, the term of this patent is extended or adjusted under 35 U.S.C. 154(b) by 0 days.

(21) Appl. No.: 16/375,498

(22) Filed: Apr. 4, 2019

(65) Prior Publication Data

US 2019/0312532 A1    Oct. 10, 2019

(51) Int. Cl.
| | |
|---|---|
| *H02P 4/00* | (2006.01) |
| *H01R 13/53* | (2006.01) |
| *H02M 1/44* | (2007.01) |
| *H02M 7/06* | (2006.01) |
| *H02M 7/5387* | (2007.01) |
| *H02P 27/08* | (2006.01) |
| *H02M 1/10* | (2006.01) |
| *D06F 34/28* | (2020.01) |

(52) U.S. Cl.
CPC .............. *H02P 4/00* (2013.01); *D06F 34/28* (2020.02); *H01R 13/53* (2013.01); *H02M 1/10* (2013.01); *H02M 1/44* (2013.01); *H02M 7/06* (2013.01); *H02M 7/53871* (2013.01); *H02P 27/08* (2013.01)

(58) Field of Classification Search
CPC ...... H02P 1/00; H02P 1/04; H02P 1/46; H02P 3/00; H02P 3/18; H02P 6/00; H02P 6/14; H02P 21/00; H02P 23/00; H02P 25/00; H02P 27/00; H02P 27/04; H02P 27/08; H02P 27/06; H02M 1/12; H02M 1/14

USPC ..... 318/400.01, 400.02, 700, 701, 721, 779, 318/799, 800, 801, 430, 432; 363/40, 44, 363/120
See application file for complete search history.

(56) References Cited

U.S. PATENT DOCUMENTS

| | | | | |
|---|---|---|---|---|
| 9,406,915 | B2 * | 8/2016 | White | B25F 5/02 |
| 2006/0267527 | A1 * | 11/2006 | Khopkar | H02P 6/28 |
| | | | | 318/400.01 |
| 2007/0170785 | A1 * | 7/2007 | McCoy | H02M 1/10 |
| | | | | 307/130 |
| 2013/0026835 | A1 * | 1/2013 | Ghosh | H02J 9/062 |
| | | | | 307/66 |
| 2015/0214781 | A1 * | 7/2015 | Ye | H02J 9/061 |
| | | | | 307/64 |

(Continued)

FOREIGN PATENT DOCUMENTS

| | | |
|---|---|---|
| JP | 07222435 A | 8/1995 |
| KR | 1020000008828 A | 2/2000 |
| KR | 1020130078964 A | 7/2013 |

*Primary Examiner* — Antony M Paul
(74) *Attorney, Agent, or Firm* — Dentons US LLP

(57) ABSTRACT

A power converting apparatus and a home appliance having the same according to the present invention includes: an input unit including an AC connection unit which receives an alternating current (AC) power from an external and a DC connection unit which receives a direct current (DC) power; a bridge diode unit which always outputs the DC power having a given polarity when DC power is connected to the input unit, and rectifies the AC power received through the input unit when the DC power is connected to the input unit; and a capacitor which is connected to a DC terminal which is an output terminal of the bridge diode unit.

16 Claims, 10 Drawing Sheets

(56) References Cited

U.S. PATENT DOCUMENTS

2019/0020284 A1* 1/2019 Danforth, III .......... H02J 7/022

* cited by examiner (a)

(b)

POWER CONVERTING APPARATUS AND HOME APPLIANCE INCLUDING THE SAME

This Application claims the benefit of foreign priority to Korean Application No. 10-2018-0039744, filed Apr. 5, 2018, which is incorporated by reference herein.

BACKGROUND OF THE INVENTION

1. Field of the Invention

The present invention relates to a power converting apparatus and a home appliance having the same, and more particularly, to a AC/DC combined power converting apparatus and a home appliance having the same.

2. Description of the Related Art

The power converting apparatus is an apparatus that converts input power and supplies converted power. Such a power converting apparatus is disposed in a home appliance, and converts the input power to a power for driving the home appliance.

For example, a power converting apparatus using AC power converts received AC power into DC power for driving a home appliance, and a power converting apparatus using DC power converts received DC power to driving power of various voltage levels so as to drive the home appliance.

FIG. 1 is a diagram illustrating an example of a configuration of an AC-based power supply system.

Referring to FIG. 1, an AC-based power supply system 1 includes a home appliance 30 that receives an AC power from the outside and operates based on an AC power, and an energy storage apparatus 20 that stores DC power generated based on AC power received from the outside or generated based on new and renewable energy.

The power supply system 1 may include a power generation apparatus based on new and renewable energy such as a solar module 40 that includes a solar cell and generates and outputs a DC power based on the solar cell.

The energy storage apparatus 20 may include at least one battery 21 and may store electric power in the battery 21 through a charger 22.

In addition, the energy storage apparatus 20 may be provided with a DC/DC converter 23 to convert into a voltage level for charging the battery 21.

Meanwhile, the energy storage apparatus 20 may supply the power generated in the solar module 40 or stored in the battery 21 to the outside. To this end, the energy storage apparatus 20 may include a DC/AC inverter 24.

Meanwhile, the battery 21 may store power based on the AC power received from the outside. In this case, the energy storage apparatus 20 may have a bidirectional converter (not shown) instead of the DC/AC inverter 24.

The AC power may be supplied from a commercial power plant 11 to the home energy storage apparatus 20, the home appliance 30, and the like.

The home appliance 30 requires an AC/DC converter 31 so as to use a DC component 32 such as an inverter designed to use DC power.

For example, the AC power received from the home appliance 30 is converted to DC power by the AC/DC converter 31, and drives the motor 33 through the inverter 32.

In some cases, an AC component 34 such as a heater, a valve, a door switch, or the like manufactured to use AC power may operate by using AC power.

Recently, as there are problems such as the deterioration in efficiency due to AC/DC conversion, the increase in components and manufacturing cost for power conversion, and the high frequency noise due to AC power, and as the DC-based distributed generation increases, the research on DC-based power supply is increased.

FIG. 2 is a diagram illustrating an example of a configuration of a DC-based power supply system.

Referring to FIG. 2, a DC-based power supply system 2 includes a home appliance 60 that receives DC power from the outside and operates based on DC power, and an energy storage apparatus 50 that stores DC power generated based on AC power received from the outside or generated based on new and renewable energy.

The energy storage apparatus 50 may include at least one battery 51 and may store power in the battery 51 through a charger 52.

Further, the energy storage apparatus 50 may include a DC/DC converter 53 to convert into a voltage level for charging the battery 51.

Meanwhile, the energy storage apparatus 50 can supply the power generated in the solar module 40 or stored in the battery 51 to the outside without the DC/AC inverter 24 or a bidirectional converter.

When DC power is supplied from a commercial power plant 12, the home appliance 60 receives the DC power, not the AC power, and can directly drive the internal constituent units. Accordingly, high-frequency noise or the like due to the AC power does not occur. Furthermore, since the converter 31, and the like is not required, the manufacturing cost is reduced. In addition, it is also possible to configure the system by using only a DC component 61, 62.

Meanwhile, as the spread of new and renewable energy including solar-light power generation is activated, and as the effort to save energy and improve energy efficiency is increased, the demand for DC appliances connected to DC distribution is increasing.

For example, related art 1 (Korean Patent Laid-Open Publication No. 10-2011-0097254 (published on Aug. 31, 2011) discloses a power supply network using a DC source and an electric appliance based thereon.

Related art 1 aims at reducing energy consumption by reducing loss due to inverter or the like, by installing a large capacity AC/DC converter in a building entrance and inputting DC power to household appliance.

However, related art 1 relates to a DC-dedicated household appliance and is difficult to use in an existing AC distribution environment.

The inability to use DC-dedicated household appliance in an AC distribution environment increases the cost of converting and makes many governments to hesitate about rapid transition to DC distribution having many advantages.

In addition, it also makes individual users to hesitate to purchase DC-dedicated household appliances that can not be used in the AC distribution environment.

In addition, in a case where the environment is not a DC-based power supply environment, a separate converter must be provided outside the household appliance. Providing a separate converter increases manufacturing cost and service cost.

In addition, it is difficult for unskilled users to install and use electrical products, and there is a risk of safety accidents.

Therefore, an AC/DC combined home appliance is required. The AC/DC combined home appliance has the advantage of being freely used in the AC distribution environment and the DC distribution environment.

In addition, the AC/DC combined home appliance has the effect of accelerating the transition to DC distribution, since customers can purchase home appliances without worrying about whether they will continue to use the AC appliances or replace them with DC appliances in the transition period to DC distribution.

In addition, there is a need for an AC/DC combined home appliance capable of improving stability by preventing arcs that may occur when DC power is used, with low cost.

In addition, there is a need for an AC/DC combined home appliance that is not difficult for non-skilled users to install and use.

SUMMARY OF THE INVENTION

The present invention has been made in view of the above problems, and provides a power converting apparatus and a home appliance including the power converting apparatus which includes an input unit which can receive an alternating current (AC) power and a direct current (DC) power and bridge diode unit which can rectify the AC power so that it can be used in both AC distribution environment and DC distribution environment. Here, when the DC power is connected, the bridge diode unit can always provide the same output of a given polarity irrespective of the connection polarity of the DC power.

In accordance with an aspect of the present invention, a power converting apparatus includes: an input unit including an AC connection unit which receives an alternating current (AC) power from an external and a DC connection unit which receives a direct current (DC) power; a bridge diode unit which always outputs the DC power having a given polarity when DC power is connected to the input unit, and rectifies the AC power received through the input unit when the DC power is connected to the input unit; and a capacitor which is connected to a DC terminal which is an output terminal of the bridge diode unit.

The power converting apparatus further includes a noise filter disposed between the input unit and the bridge diode unit.

The input unit further includes a relay which interrupts the AC power received through the AC connection unit.

The relay blocks the AC power when both the AC power and the DC power are received.

The input unit includes an AC input detection unit which detects an input of the AC power and a DC input detection unit which detects an input of the DC power.

The input unit further includes a relay which blocks a connection between the AC connection unit and the bridge diode unit when the DC input detection unit detects the input of the DC power.

The power converting apparatus further includes an inverter unit which drives a motor, based on the power stored in the capacitor.

The power converting apparatus further includes a voltage conversion unit which is connected to the DC terminal, and supplies the DC power to at least one load.

The bridge diode unit converts the AC power received through the AC connection unit into DC power, and outputs the DC power to the DC terminal The AC connection unit is connected to an AC plug and the DC connection unit is connected to a DC plug, and the DC plug is provided with an arc extinction device.

The bridge diode unit includes: a first diode which has an anode terminal connected to a first terminal of the input unit; a second diode which has a cathode terminal connected to the first terminal of the input unit; a third diode which has a cathode terminal connected to a cathode terminal of the first diode and has an anode terminal connected to a second terminal of the input unit; and a fourth diode which has an anode terminal connected to an anode terminal of the second diode and has a cathode terminal connected to the second terminal of the input unit.

The first diode and the fourth diode are turned on, when a positive polarity of the DC power is connected to the first terminal and a negative polarity of the DC power is connected to the second terminal.

The second diode and the third diode are turned on, when a negative polarity of the DC power is connected to the first terminal and a positive polarity of the DC power is connected to the second terminal.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. With respect to constituent elements used in the following description, suffixes "module" and "unit" are given only in consideration of ease in the preparation of the specification, and do not have or serve as specially important meanings or roles. Thus, the "module" and "unit" may be mingled with each other. It will be understood that although the terms first, second, etc. may be used herein to describe various elements, these elements should not be limited by these terms. These terms are only used to distinguish one element from another. A singular representation may include a plural representation unless context clearly indicates otherwise. Terms such as "includes" or "has" used herein should be considered as indicating the presence of several components, functions or steps, disclosed in the specification, and it is also understood that more or fewer components, functions, or steps may likewise be utilized.

Figure 1:
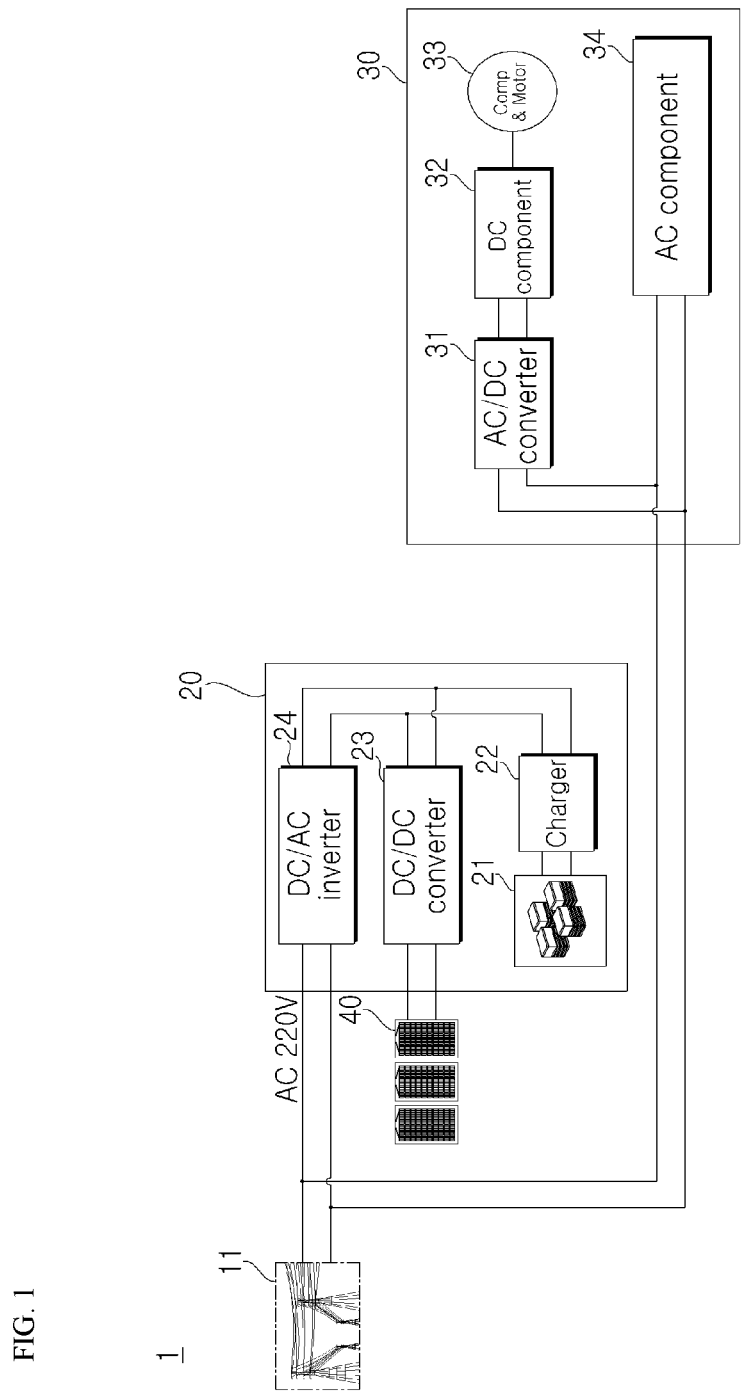
FIG. 1 is a diagram illustrating an example of a configuration of an AC-based power supply system.
Figure 2:
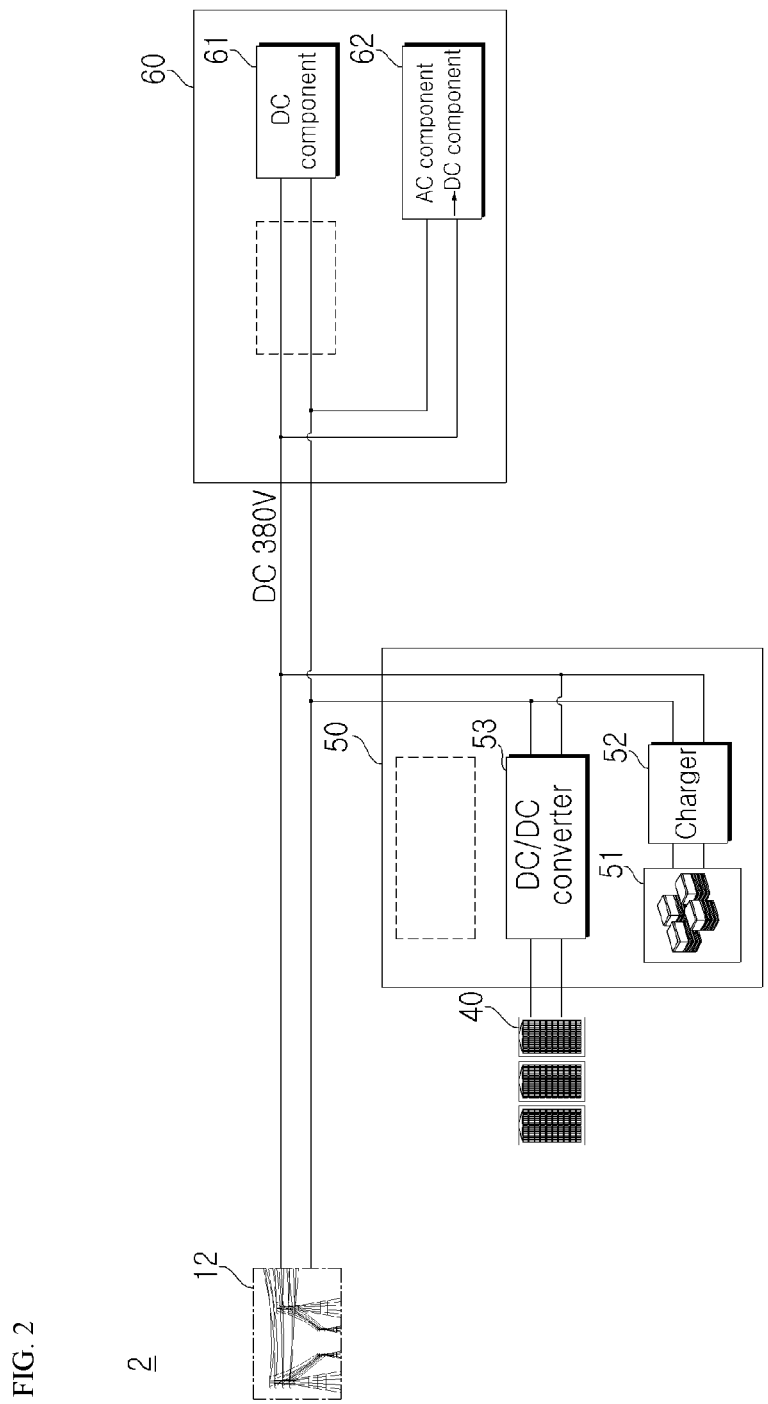
FIG. 2 is a diagram illustrating an example of a configuration of a DC-based power supply system.
Figure 3:
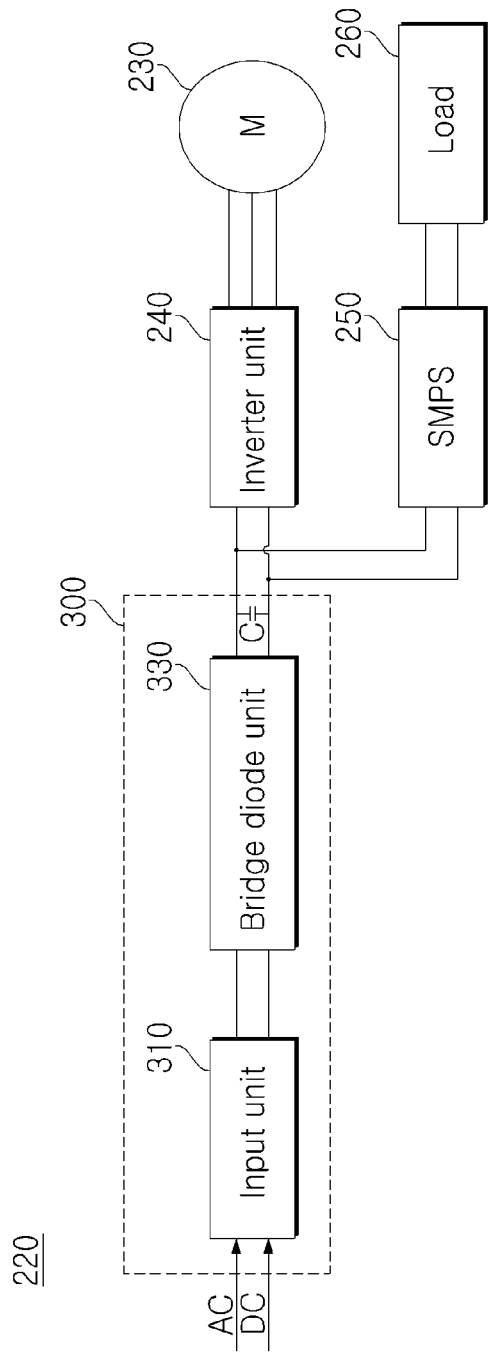
FIG. 3 is a schematic internal block diagram of a power converting apparatus according to an embodiment of the present invention.

FIG. 3 is a schematic internal block diagram of a power converting apparatus according to an embodiment of the present invention.

Meanwhile, a power converting apparatus 220 described in this specification may be a power converting apparatus provided inside a home appliance.

The home appliance may be a refrigerator, a washing machine, a dryer, an air conditioner, a dehumidifier, a cooking apparatus, a cleaner, a lighting apparatus, an electric vehicle, a drone, a TV, a monitor, a mobile terminal, a wearable apparatus, a server, and the like.

Referring to FIG. 3, the power converting apparatus 220 according to an embodiment of the present invention may include an input unit 310 which can receive an alternating current (AC) power and a direct current (DC) power, and a bridge diode unit 330 which rectifies the AC power, so that it can be used in an AC distribution environment and a DC distribution environment.

Here, the bridge diode unit 330 may provide the same output irrespective of the connection polarity of DC power.

The bridge diode unit 330 may serve as a converter when AC power is inputted and serve as a safety device to prevent a safety accident due to a reverse connection when DC power is inputted.

Referring to FIG. 3, the power converting apparatus 220 according to the embodiment of the present invention may include a power supply unit 300 which processes and outputs input power.

In the related art, AC electric appliances using AC power and DC electric appliances using DC power have been designed differently for the configuration of power supply circuit.

However, the power supply unit 300 according to an embodiment of the present invention is a common unit designed to be used for both the AC power and the DC power, and may receive the AC power and the DC power, and may output the DC power.

The power supply unit 300 according to an embodiment of the present invention may include an input unit 310 which receives power from the outside, a bridge diode unit 330 which always outputs the DC power having a given polarity when DC power is connected to the input unit 310, and rectifies the AC power received through the input unit 310 when the DC power is connected to the input unit 310, and a capacitor C which is connected to an output terminal of the bridge diode unit 330.

The bridge diode unit 330 may include a plurality of diodes. When the DC power is received through the input unit 310, the other diode of the plurality of diodes may be turned on according to the polarity of the DC power, so that it may serve as a safety device.

According to an embodiment of the present invention, a system capable of receiving both AC/DC power can be configured by commonly using the input unit 310 and the bridge diode unit 330.

Accordingly, a user in the DC power distribution environment can use a home appliance having the power converting apparatus according to the present invention, and a user in the AC power distribution environment can use the home appliance having the power converting apparatus according to the present invention.

In addition, it can be used as AC household appliances in an area where DC power distribution is not available. Even if DC power distribution becomes available later, it can be used as DC household appliance without need to replace the home appliances.

In addition, user may use it stably as the DC appliances even when DC distribution is partially spread.

Power given to the input unit 310. For example, at least one of an AC power and a DC power given to the input unit 310 from outside. Here, the outside may include a power plant capable of supplying power, a solar module, an energy storage device, and the like.

The input unit 310 may include an AC connection unit (see 311 of FIG. 4 and the like) for receiving the AC power from the outside and a DC connection unit (see 312 of FIG. 4 and the like) for receiving the DC power.

The AC connection unit 311 may be connected to an AC plug 301 and the DC connection unit 312 may be connected to a DC plug 302. The user may install and operate the home appliance by performing a simple operation of connecting the AC plug and/or the DC plug 302 to the input unit 310 and plugging it into an outlet.

According to an embodiment, the AC plug 301 and the DC plug 302 may be previously connected to the AC connection unit 311 and the DC connection unit 312, respectively, by the manufacturer. Preferably, one of the AC plug 301 and the DC plug 302 may be connected to a corresponding connection unit among the AC connection unit 311 and the DC connection unit 312.

In this case, user can install and operate the home appliance by a simple operation of plugging the AC plug 301 and/or the DC plug 302 into the outlet.

However, unlike the alternating current, in the case of the direct current, as the electric current flows uniformly, a zero crossing point of the current does not exist and the natural extinction cannot be performed, so that an arc may be generated at electric contact.

In particular, when a power plug having no DC arc discharge countermeasure device is opened, a counter electromotive force generated in a DC load may be induced in the plug, thereby causing a large arc.

Therefore, preferably, the DC plug may include an arc extinction device. For example, the DC plug may include at least one of an electrically operated extinction device that restricts the counter electromotive force that significantly increases the arc voltage, a magnetic extinction device that uses magnetic force, and an extinction device that uses a mechanical contact.

The power converting apparatus 220 according to an embodiment of the present invention may be configured to selectively inputted to the DC plug and the AC plug. In this case, the DC plug which is a power plug at the time of DC input may be equipped with an arc extinction device to prevent an occurrence of arc at the time of first connection and to prevent an occurrence of arc at the time of opening the plug due to a user error during operation.

According to the embodiment, the input unit 310 may further include a relay for interrupting the AC power received through the AC connection unit 311.

The input unit 310 may further include an AC input detection unit for detecting the input of the AC power and a DC input detection unit for detecting the input of the DC power. When the DC input detection unit detects the input of the DC power, the relay may block a connection between the AC connection unit and the bridge diode unit.

The relay may operate to block the AC power when both the AC power and the DC power are received. For example, when the input of the AC power and the DC power is detected and both the AC power and the DC power are input simultaneously, the relay of the AC line may be blocked to receive only the DC power. Accordingly, a high-efficiency DC power may be preferentially used.

Further, the relay may operate to switch to the AC power when DC power failure occurs. For example, the DC power can be switched to the AC power, immediately after the failure of the DC power distribution. Thus, a refrigerator may be used with a DC distributed power, and may be switched to the AC power to prevent food spoiling in case of the failure of DC distributed power.

According to the embodiment, the relay may operate to switch to the DC power when failure of AC power occurs.

The bridge diode unit 330 may be composed of a plurality of diodes.

The bridge diode unit 330 may be composed of a diode or the like without a switching element, and may perform a rectifying operation without an additional switching operation when an AC power is inputted.

The bridge diode unit 330 may convert the AC power received through the AC connection unit 311 into DC power, and output the DC power to the DC terminal.

The bridge diode unit 330 may operate as a converter when AC power is inputted, and may rectify the AC power received by the input unit 310 and output the rectified power. The rectified power may be stored in a DC terminal capacitor C.

In the drawing, a single element is exemplified as the DC terminal capacitor C, but a plurality of elements may be provided to ensure the element stability.

Meanwhile, in both ends of the DC terminal capacitor C (between the terminals n1 and n2), the DC power may be stored, and may be referred to as a DC terminal or a DC link terminal.

In the bridge diode unit 330, when the DC is received, the other diode of the plurality of diodes may be turned on according to the polarity of the DC power received by the input unit 310, such that a power having a given polarity can be output all the time.

Accordingly, the bridge diode unit 330 may operate as a safety device, and the DC power having polarity can be used safely. Irrespective of the polarity of the DC power which is connected by an unskilled user, the bridge diode unit 330 may have the same output, thereby enhancing both safety and convenience.

The bridge diode unit 330 may be removed from DC appliances using a DC power. However, the bridge diode unit 330 may not be removed to prevent a safety accident such as a fire due to a polarity change of a positive DC terminal or a negative DC terminal, and may form the common power supply unit 300.

The bridge diode unit 330 may serve as a safety device for DC reverse connection, so that the power converting apparatus 220 can stably operate normally even if the DC polarity is changed.

The power converting apparatus 220 according to an embodiment of the present invention may further include a noise filter (see 320 in FIG. 4 or the like) for removing a noise component from the input power, and the noise filter 320 may be disposed between the input unit 310 and the bridge diode unit 330.

The power converting apparatus 220 may further include an inverter unit 240 for driving the motor 230, based on the power stored in the DC terminal capacitor C. For example, the inverter unit 240 may be an intelligent power module (IPM), in which a switching element (IGBT) and a diode (FRD) are connected, that converts the DC power into a three-phase AC and supplies the AC to the motor 230. In addition, the inverter unit 240 may include an inverter for driving the motor 230 and an inverter controller for controlling the inverter.

Meanwhile, the power converting apparatus 220 may further include a voltage conversion unit 250 connected to the DC terminal to supply DC power to at least one load 260. The voltage conversion unit 250 may convert the DC power stored in the DC terminal capacitor C to a given level and output the converted DC power.

The voltage conversion unit 250 may convert the DC power stored in the DC terminal capacitor C and output the converted DC power. For example, the voltage conversion unit 250 may include a switched mode power supply (SMPS).

In some cases, the voltage conversion unit 250 may output the reduced voltage. The voltage conversion unit 250 may output various voltage levels included in the driving of each unit inside the home appliance.

For example, the DC power 380V may be used for energy storage system (ESS), solar power generation, electric vehicle (EV), inverter household appliances, and the like, and the loads of 24V or less such as a video/computer equipment, an internal unit in household appliances, and the like may respond by reducing the voltage through the voltage conversion unit 250.

The inverter unit 240 and the voltage conversion unit 250 may be connected to the DC terminal in parallel.

The home appliance having the power converting apparatus 220 according to an embodiment of the present invention can be used as an AC household appliance in an area where DC distribution is not available, and can be used as a DC household appliance without need to replace the product even if the DC distribution becomes available later.

In addition, since the home appliance having the power converting apparatus 220 according to the embodiment of the present invention includes the power supply unit 300 capable of receiving both the AC/DC power, it can be not only used as a DC home appliance at the time of partially spreading the DC distribution, but can be switched to the AC power immediately after the failure of DC distribution. Accordingly, it is more useful in a transitional environment or in a mixed environment of the AC and the DC.

Further, even when a distributed power generation, such as photovoltaic power generation that generates electric power as DC, is used, it is possible to use the AC commercial power when necessary while using the distributed power generation source, thereby improving safety and efficiency.

Meanwhile, the power supply unit 300 may operate under the control of a controller (not shown) of the home appliance.

The controller of the home appliance may control the overall operation of the home appliance.

In addition, the controller of the home appliance may control the operation of the power converting apparatus 220. For example, the controller may output a corresponding speed command value signal to the power converting apparatus 220 based on a target value. Then, the power converting apparatus 220 may drive the motor, and the motor may be operated at a target rotation speed based on the speed command value signal.

In addition, the controller of the home appliance may control the operation of the power supply unit 300. For example, the controller may receive various data sensed in the power supply unit 300, and may control operation of switching element, relay, and the like based on the received data.

According to an embodiment, the power converting apparatus 220 may operate under the control of a given microcomputer (not shown). The microcomputer may control switching element, relay, sensor, and the like of the power converting apparatus. For example, the microcomputer may control the turning on/off of switching element provided in the power supply unit 300 or the like.

The microcomputer may generate a control signal for controlling one or more units provided in the home appliance, and may transmit the control signal to each unit. Alternatively, one or more microcomputers may be provided in the power converting apparatus 220.

Figure 4:
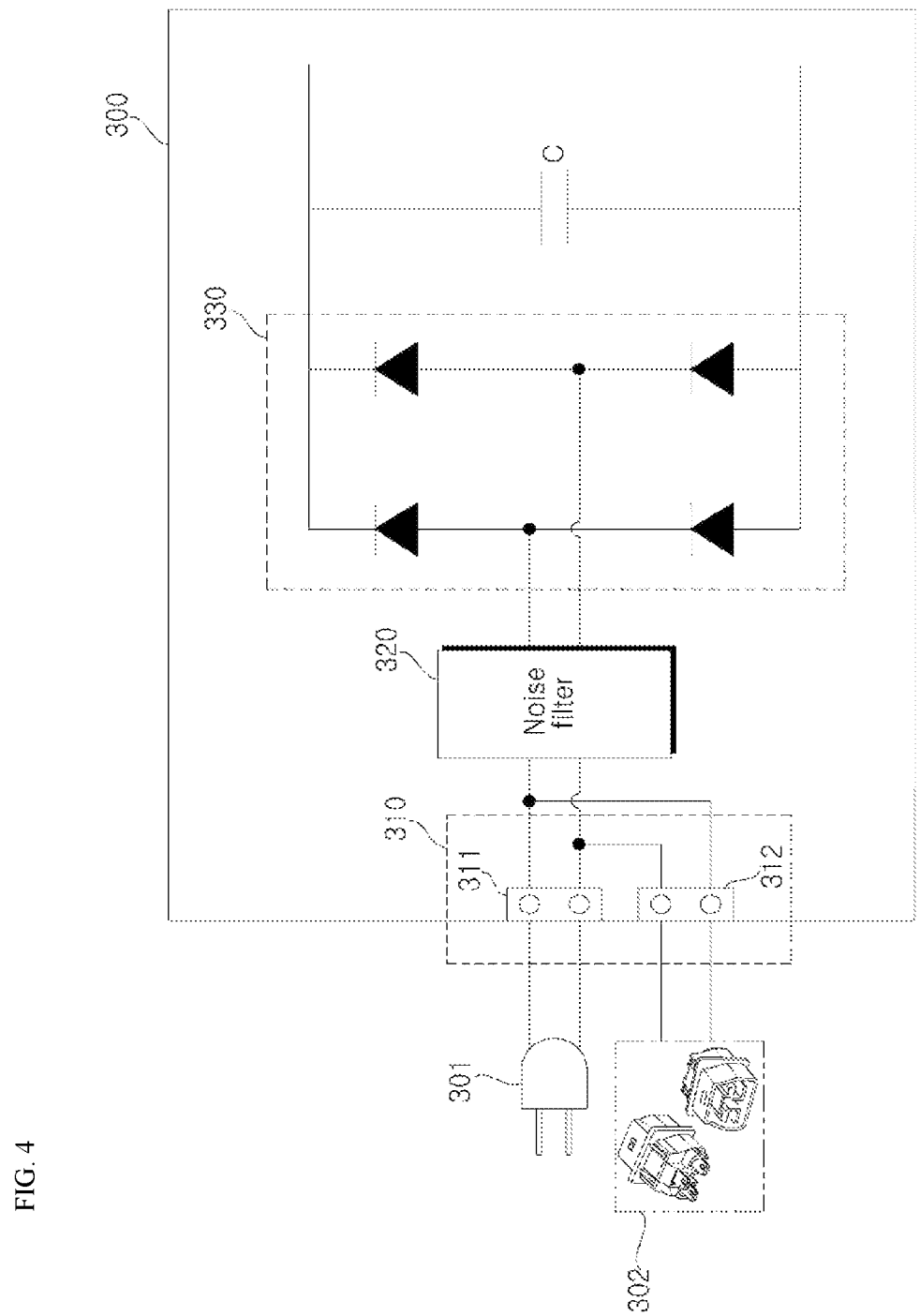
FIG. 4 is a schematic internal block diagram of a power converting apparatus according to an embodiment of the present invention.

FIG. 4 is a schematic internal block diagram of a power converting apparatus according to an embodiment of the present invention, more specifically, is an example of the power supply unit 300.

The power converting apparatus 220 according to an embodiment of the present invention may include a common power supply unit 300 that can use both a DC power and an AC power.

Referring to FIG. 4, the power supply unit 300 may include an input unit 310 including an AC connection unit 311 for receiving an AC power from the outside and a DC connection unit 312 for receiving a DC power, a bridge diode unit 330 which operates as a safety device by outputting a power having a given polarity irrespective of the polarity of the connected DC power when DC power is received, and performs a rectification operation when AC power is received, and a capacitor C which is connected to a DC terminal which is an output terminal of the bridge diode unit 330.

The AC connection unit 311 may be connected to the AC plug 301 and may receive AC power. The DC connection unit 312 may be connected to the DC plug 302 and may receive DC power.

The user can easily install and operate the home appliance in any power supply system environment by a simple operation of plugging the AC plug 301 and/or the DC plug 302 into the outlet.

Meanwhile, the DC plug 302 preferably includes an extinction device capable of preventing arc discharge. Accordingly, the DC plug 302 can prevent an arc discharge that may occur when the DC plug 302 is initially connected, in a DC power use environment. In addition, the DC plug 302 can prevent an arc discharge that may occur when plug is opened due to user mistake during the operation of a home appliance in the DC power use environment.

The bridge diode unit 330 may rectify the AC power, when the AC power is inputted through the AC connection unit 311.

When the DC power is inputted through the DC connection part 312, the bridge diode unit 330 may operate as a safety device for preventing a safety accident due to the reverse connection, by providing the same output irrespective of the connection polarity of the DC power.

Accordingly, it is not necessary to consider the polarity when using the DC plug 302, and a non-skilled user can also safely install and use the home appliance.

The bridge diode unit 330 may include a plurality of diodes connected in a bridge form. For example, in the bridge diode unit 330, four diodes or six diodes may be used in a bridge form.

The bridge diode unit 330 may operate normally even when the DC polarity is changed, thereby preventing a fire that may occur due to the polarity change of the positive terminal and the negative terminal of the DC power due to the reverse connection.

When DC power is inputted, the operation of the bridge diode unit 330 will be described later in detail with reference to FIG. 7 and FIG. 8.

The power supply unit 300 according to an embodiment of the present invention may further include a noise filter 320 disposed between the input unit 310 and the bridge diode unit 330. For example, the noise filter 320 may be an electromagnetic interference (EMI) filter which is connected to the input unit 310 and removes a noise component of the AC power supplied through the AC connection unit 311.

Figure 5:
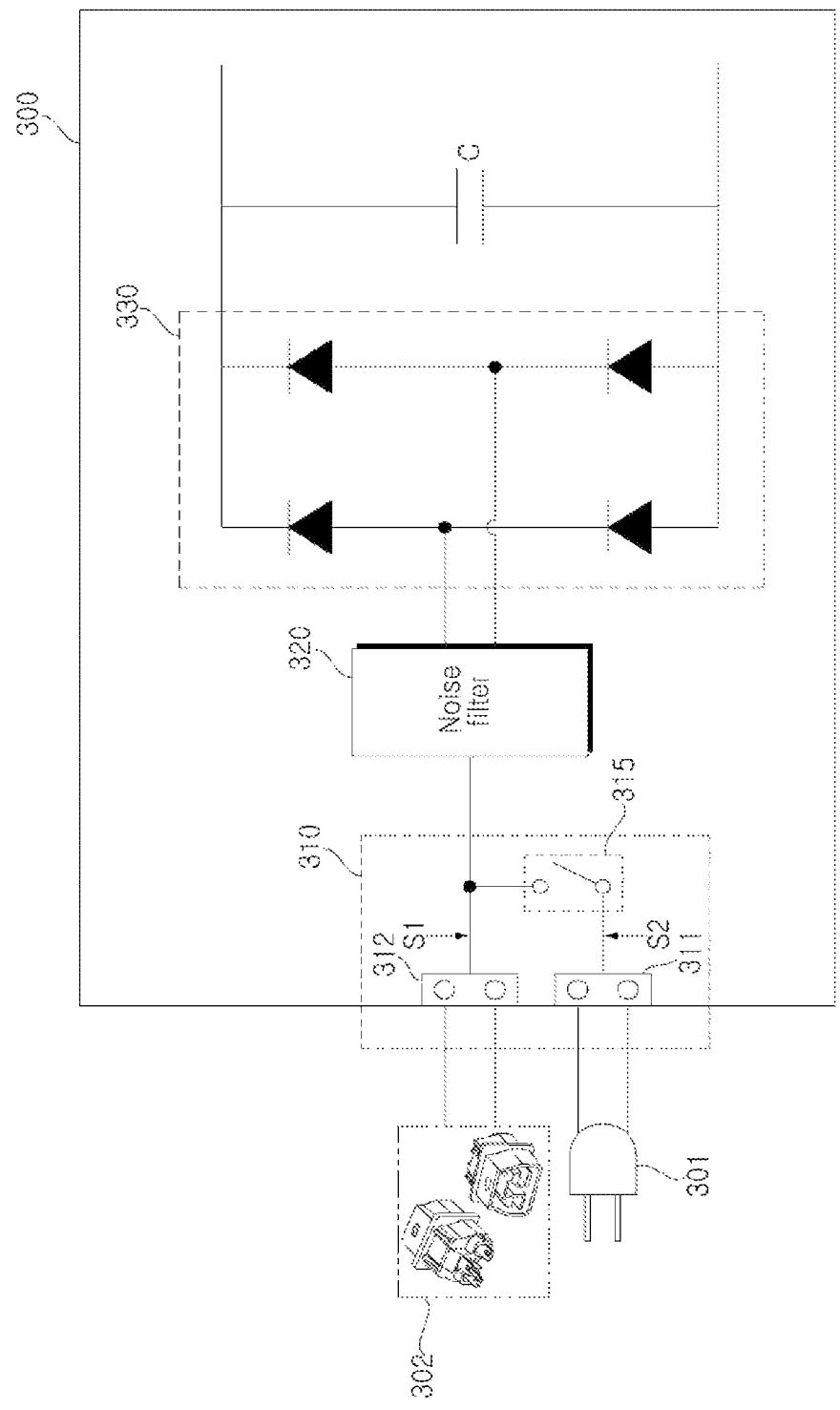
FIG. 5 is a schematic internal block diagram of a power converting apparatus according to an embodiment of the present invention.

FIG. 5 is a schematic internal block diagram of a power converting apparatus according to an embodiment of the present invention, more specifically, is an example of the power supply unit 300.

The power supply unit 300 illustrated in FIG. 5 differs from the power supply unit 300 illustrated in FIG. 4 in that it further includes a relay 315, and the remaining portions are the same. Therefore, in the following description, the relay 315 will be mainly described to explain the difference.

The input unit 310 according to an embodiment of the present invention may further include the relay 315 for interrupting AC power received through the AC connection unit 311.

The input unit 310 may further include an AC input detection unit S2 for detecting the input of the AC power and a DC input detection unit S1 for detecting the input of the DC power. The relay 315 may block the connection between the AC connection unit 311 and the bridge diode unit 330, when the DC input detection unit S1 detects the input of the DC power.

The relay 315 may operate to block the AC power when both the AC power and the DC power are received. Accordingly, a high-efficiency DC power may be preferentially used.

Further, the relay 315 may be operated to switch to the AC power when failure occurs in the DC power. For example, when a system failure occurs in a DC distribution system, it may be switched to the AC power. Thus, in case of the failure of the DC distributed power supply, it may be operated stably by switching to the AC power.

According to an embodiment, the relay 315 may be operated to switch to the DC power when failure occurs in the AC power.

According to an embodiment of the present invention, the DC plug 302 and the AC plug 301 can be selectively input.

In addition, the overlapped input of the AC power and the DC power may be prevented through the relay 315 that interrupts the AC power received through the AC connection unit 311.

The relay 315 may be provided as a safety device, in the case of connecting both the DC plug 302 and the AC plug 301 due to misuse or for backup.

The input power may be detected through the AC input detection unit S2 for detecting the input of the AC power at the output terminal of the AC connection unit 311 and the DC input detection unit S1 for detecting the input of the DC power at the output terminal of the DC connection unit 312.

The AC input detection unit S2 and the DC input detection unit S1 may include a resistance element, an OP AMP, and the like for voltage detection.

When the input of AC power and the input of DC power are overlapped, the relay 315 may be opened (A-B open), so that only the DC power having high efficiency can be input.

In addition, the relay 315 may maintain the turned-on state (A-B Short) in a normal state in which the input of AC power and the input of DC power are not overlapped.

Figure 6:
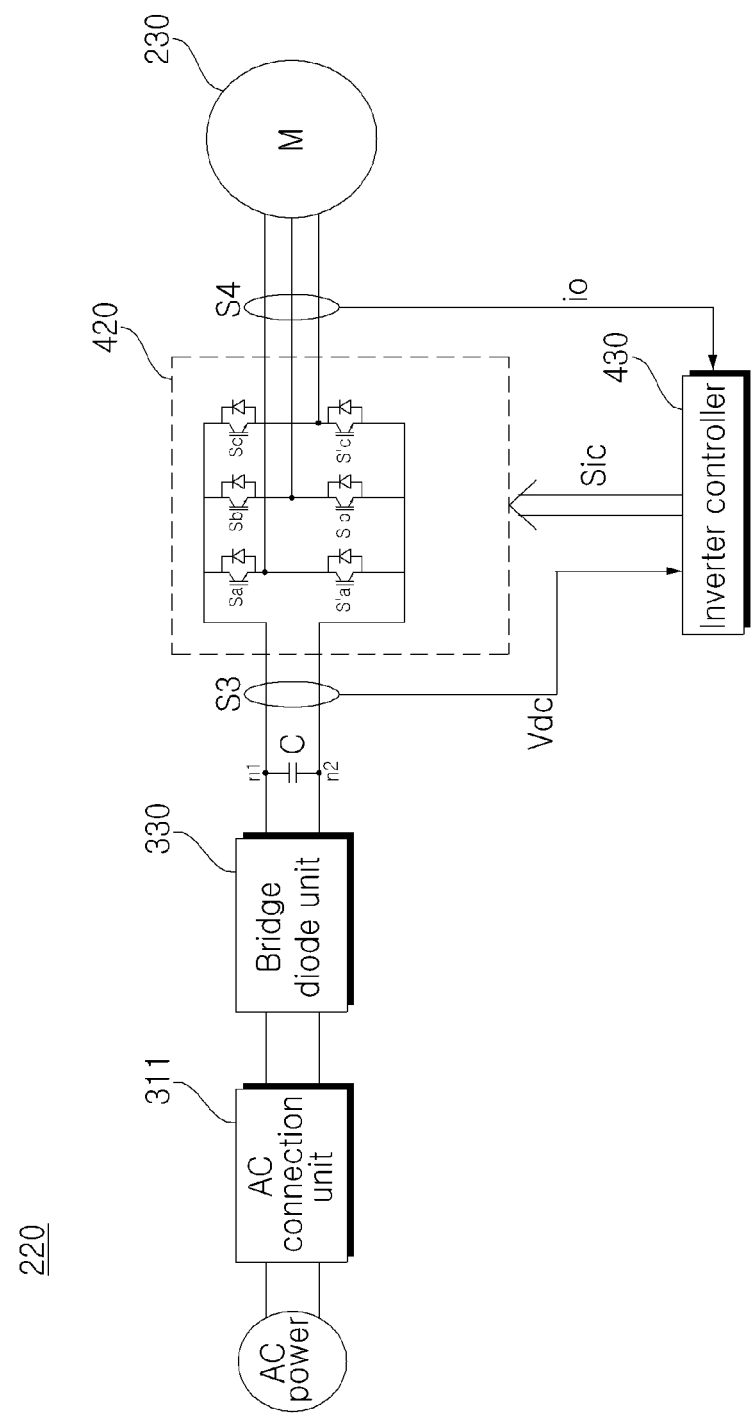
FIG. 6 is a diagram for explaining an operation of a power converting apparatus according to an embodiment of the present invention.

FIG. 6 is a diagram for explaining an operation of a power converting apparatus according to an embodiment of the present invention, and shows an example of an internal circuit diagram of the power converting apparatus. Meanwhile, the inverter controller may operate in the same or similar manner when the DC power is connected.

Meanwhile, FIG. 6 illustrates a case where the power converting apparatus 220 is used as a motor driving apparatus for converting power supplied from an AC power source and supplying the power to the motor 230. In this case, the power converting apparatus 220 may be called a motor driving apparatus, a motor driving unit, or the like.

In addition, the power converting apparatus 220 may directly supply the power input from the DC power source to the motor 230 to drive the motor 230.

Alternatively, the power converting apparatus 220 may convert input power and supply the power to the load. In FIG. 6, the power converting apparatus 220 is mainly described as an example of a motor driving apparatus, but the present invention is not limited thereto.

The motor driving apparatus 220 may include an input unit 310, an inverter 420, and an inverter controller 430.

The input unit 310 may include the AC connection unit 311 and the DC connection unit 312. The input unit 310 may receive the AC power through the AC connection unit 311, when the AC power is connected. In addition, the input unit 310 may receive the DC power through the DC connection unit 312, when the DC power is connected.

In addition, the motor driving apparatus 220 according to an embodiment of the present invention may include a DC terminal voltage detection unit S3, a DC terminal capacitor C, and an output current detection unit S4.

Hereinafter, a case where AC power is inputted will be illustrated to describe the operation of each constituent unit in the motor driving apparatus 220.

The AC connection unit 311 may receive the AC power and output the power to the bridge diode unit 330. The bridge diode unit 330 may rectify the AC power and output the power to the DC terminal (between n1 and n2 terminals).

The DC terminal capacitor C may make smooth for the input power and store this power. The DC terminal voltage detection unit S3 may detect the voltage Vdc of the DC terminal which is both ends of the DC terminal capacitor C. To this end, the DC terminal voltage detection unit S3 may include a resistance element, an amplifier, and the like. The detected DC terminal voltage (Vdc) given to the inverter controller 430 as a discrete signal in the form of a pulse.

The inverter 420 may include a plurality of inverter switching elements, and may convert the DC power Vdc smoothed by the turned-on/off operation of the switching element into a three-phase AC power (va, vb, vc) having a given frequency, and outputs the power to the three-phase synchronous motor 230.

The switching elements in the inverter 420 may perform the turned-on/off operation of respective switching elements, based on an inverter switching control signal Sic from the inverter controller 430. Thus, the three-phase AC power having a given frequency may be outputted to the three-phase synchronous motor 230.

The inverter controller 430 may control the switching operation of the inverter 420, based on a sensorless method. To this end, the inverter controller 430 may receive the output current idc detected by the output current detection unit S4.

The inverter controller 430 may output the inverter switching control signal Sic to the inverter 420 so as to control the switching operation of the inverter 420. The inverter switching control signal Sic may be a switching control signal of the pulse width modulation method (PWM), and may be generated and outputted based on the output current idc detected by the output current detection unit S4.

The output current detection unit S4 may detect the output current idc flowing to the three-phase motor 230.

As shown in the drawing, the output current detection unit S4 may be disposed between the inverter 420 and the motor 230 so as to detect a current flowing in the motor 230.

The detected output current idc may be applied, as a discrete signal in the form of a pulse, to the inverter controller 430, and the inverter switching control signal Sic may be generated based on the detected output current idc.

Figure 10:
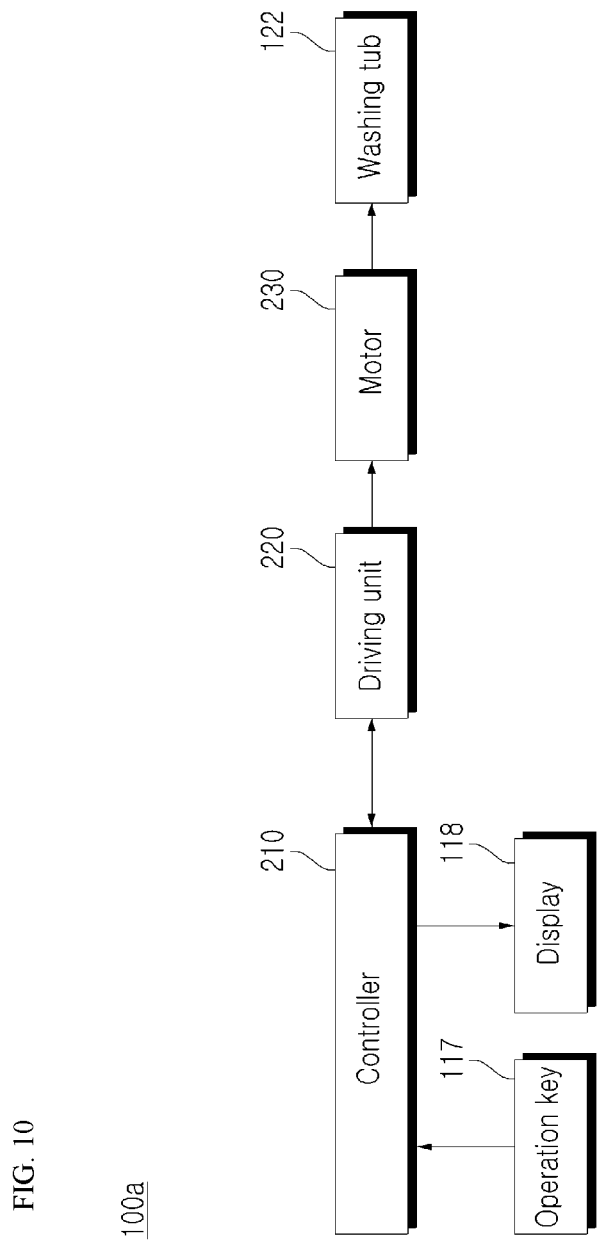
FIG. 10 is an internal block diagram of a laundry treatment apparatus which is an example of a home appliance according to an embodiment of the present invention.
Figure 11:
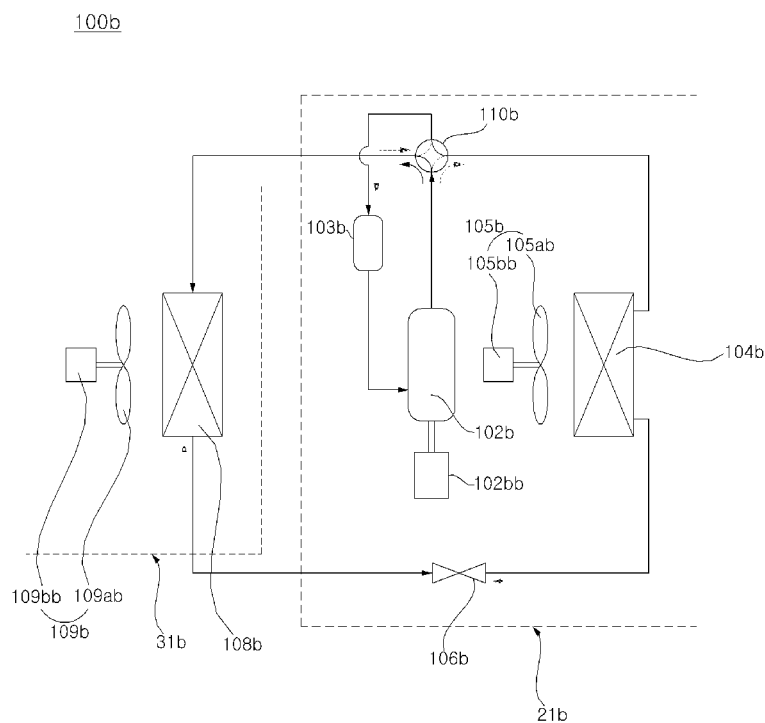
FIG. 11 is a schematic diagram illustrating an outdoor unit and an indoor unit of an air conditioner which is another example of a home appliance according to an embodiment of the present invention.
Figure 12:
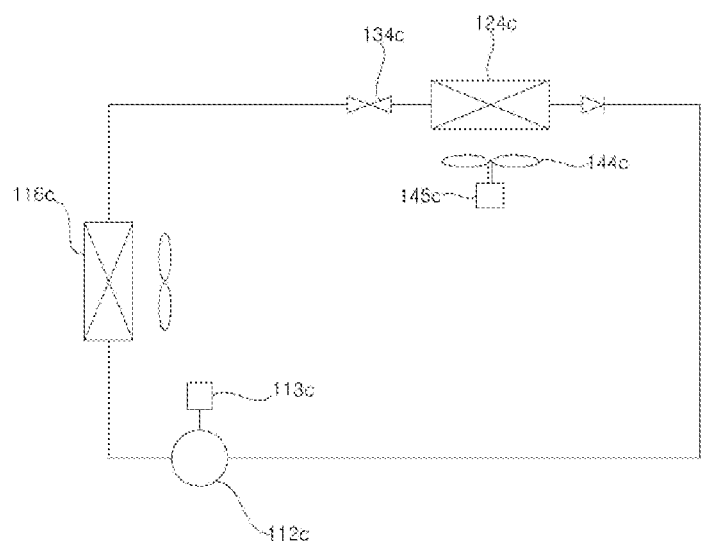
FIG. 12 is a schematic diagram illustrating a configuration of a refrigerator which is another example of a home appliance according to an embodiment of the present invention.

Meanwhile, the above mentioned motor driving apparatus 220 may be applied to various electronic apparatuses. For example, the motor driving apparatus 220 may be applied to a laundry treatment apparatus, an air conditioner, a refrigerator, a water purifier, a cleaner, a vehicle, a robot, a drone, and the like among a home appliance. FIGS. 10 to 12 will illustrate various examples of home appliance applicable to the motor driving apparatus 220.

Figure 7:
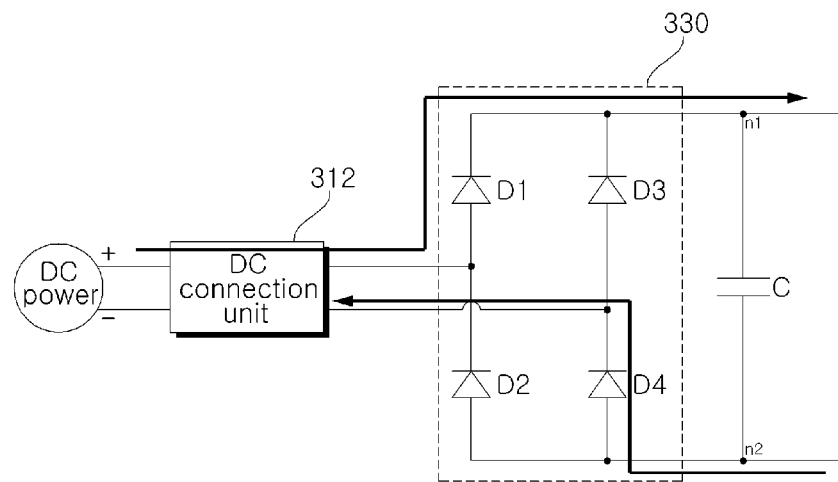
FIG. 7 to FIG. 9 are diagrams for explaining an operation of a power converting apparatus according to an embodiment of the present invention.
Figure 8:
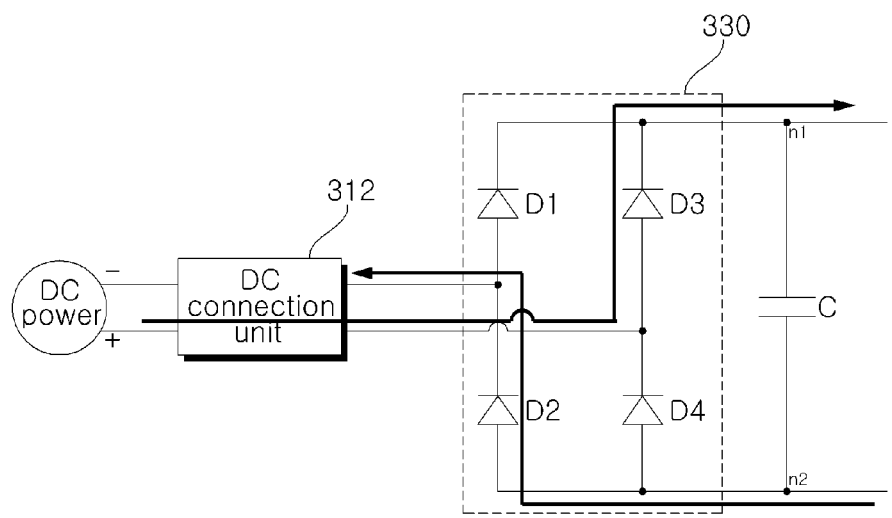
Figure 9:
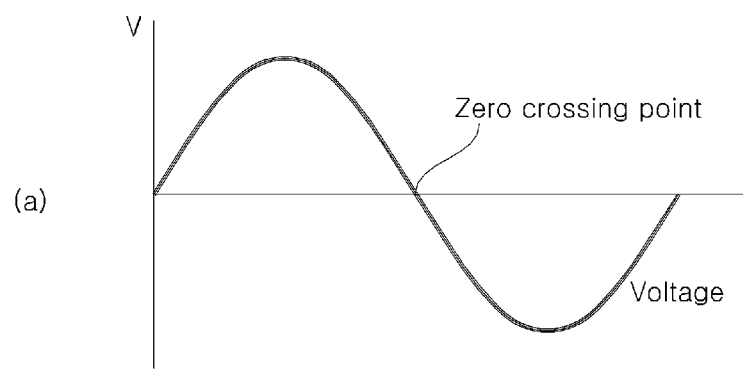
Figure 9:

FIG. 7 to FIG. 9 are diagrams for explaining an operation of a power converting apparatus according to an embodiment of the present invention, and more particularly, diagrams for explaining an operation when DC power is inputted.

FIG. 7 and FIG. 8 illustrate a detailed operation example of the bridge diode unit 330 according to an embodiment of the present invention.

Referring to FIG. 7, the bridge diode unit 330 according to an embodiment of the present invention may include a first diode D1 having an anode terminal connected to a first terminal of the input unit 310, a second diode D2 having a cathode terminal connected to the first terminal of the input unit 310, a third diode D3 having a cathode terminal connected to a cathode terminal of the first diode D1 and an anode terminal connected to a second terminal of the input unit 310, and a fourth diode D4 having an anode terminal connected to an anode terminal of the second diode D2 and a cathode terminal connected to the second terminal of the input unit 310.

When DC power is inputted, the DC connection unit 312 of the input unit 310 may receive and output the DC power. Therefore, FIG. 7 and FIG. 8 schematically show the DC connection unit 312 of the input unit 310.

As shown in FIG. 7, when the positive polarity of the DC power is connected to the first terminal and the negative polarity of the DC power is connected to the second terminal, the first diode D1 and the fourth diode D4 may be turned on. In addition, the second diode D2 and the third diode D3 may block current.

Accordingly, the positive polarity may be connected to a first node n1 of the DC terminal, and current may flow toward the first node n1 from the first diode d1.

In addition, the negative polarity may be connected to a second node n2 of the DC terminal, and current may flow toward the fourth diode d4 from the second node n2.

On the other hand, as shown in FIG. 8, when the negative polarity of the DC power is connected to the first terminal and the positive polarity of the DC power is connected to the second terminal, the second diode D2 and the third diode D3 may be turned on.

Accordingly, the positive polarity may be connected to the first node n1 of the DC terminal, and current may flow toward the first node n1 from the third diode D3.

In addition, the negative polarity may be connected to the second node n2 of the DC terminal, and current may flow toward the second diode D2 from the second node n2.

According to the present invention, even if the polarity of the DC power is reversed as shown in FIGS. 7 and 8, a given polarity may be connected to the first node n1 and the second node n2 of the DC terminal, so that a mis-connection that reverses the polarity can be prevented.

In addition, a fire due to mis-connection can be prevented, and even unskilled user can install and use home appliance safely.

FIG. 9 shows a voltage in the AC distribution and the DC distribution.

Referring to FIG. 9(a), since the AC voltage/current has its own zero crossing point, natural extinction can be achieved, so that arc can be eliminated naturally.

Referring to FIG. 9(b), since the DC voltage/current does not have a zero crossing point, natural extinction cannot be achieved and a large energy arc may occur. In addition, the generated arc may be maintained.

In the case of DC distribution, the arc can be eliminated naturally. Therefore, it is preferable that the DC plug 302, which is a component used only in DC distribution, has an extinction device capable of preventing arc discharge. Accordingly, the DC plug 302 may prevent an arc discharge that may occur when the DC plug 302 is initially connected, in a DC power use environment. In addition, the DC plug 302 may prevent an arc discharge that may occur when plug is opened due to user mistake during the operation of a home appliance in the DC power use environment.

FIG. 10 is an internal block diagram of a laundry treatment apparatus.

Referring to FIG. 10, in a laundry treatment apparatus 100a, the driving unit 220 may be controlled by a control operation of a controller 210, and the driving unit 220 may drive the motor 230. Accordingly, a washing tub 122 may be rotated by the motor 230.

The controller 210 may receive an operation signal from an operation key 117 to perform operation. Accordingly, washing, rinsing, and dewatering may be performed.

In addition, the controller 210 may control a display 118 to display washing course, washing time, dewatering time, rinsing time, current operation state, or the like.

Meanwhile, the controller 210 may control the driving unit 220 so that the driving unit 220 controls to operate the motor 230. At this time, a position detection unit for detecting the rotor position of the motor may not be provided inside or outside the motor 230. That is, the driving unit 220 may control the motor 230 by a sensorless method.

The driving unit 220 may drive the motor 230, and may include an inverter (not shown), an inverter controller (not shown), an output current detection unit (S4 of FIG. 6) for detecting an output current flowing to the motor 230, and an output voltage detection unit (not shown) for detecting an output voltage vo applied to the motor 230.

For example, an inverter controller (430 of FIG. 6) in the driving unit 220 may estimate the rotor position of the motor 230, based on the output current idc and the output voltage vo. Then, the inverter controller may control to rotate the motor 230, based on the estimated rotor position.

Specifically, the inverter controller (430 of FIG. 6) may generate a switching control signal (Sic of FIG. 6) of a pulse width modulation (PWM) method, based on the output current idc and the output voltage vo, and output the switching control signal to an inverter (not shown). Then, an inverter (not shown) may perform a high-speed switching operation, and supply the AC power of a given frequency to the motor 230. In addition, the motor 230 may be rotated by the AC power of a given frequency.

Meanwhile, the driving unit 220 may correspond to the power converting apparatus (motor driving apparatus), as shown in FIG. 3.

Meanwhile, the controller 210 may detect the laundry amount, based on the output current idc flowing to the motor 230 or the like. For example, the controller 210 may detect the laundry amount, based on the current value idc of the motor 230, while the washing tub 122 rotates.

In particular, when detecting the laundry amount, the controller 210 may accurately detect the laundry amount by using a stator resistance and an inductance value of the motor measured in a motor alignment section.

Meanwhile, the controller 210 may detect the amount of eccentricity of the washing tub 122, i.e., the unbalance UB of the washing tub 122. Such eccentricity detection may be performed based on the ripple component of the output current idc flowing to the motor 230 or the rotational speed change amount of the washing tub 122.

In particular, when detecting the laundry amount, the controller 210 may accurately detect the amount of eccentricity, by using the stator resistance and the inductance value of the motor measured in the motor alignment section.

FIG. 11 is a schematic diagram illustrating an outdoor unit and an indoor unit of an air conditioner which is another example of a home appliance according to an embodiment of the present invention Referring to FIG. 11, the air conditioner 100b may be roughly divided into an indoor unit 31b and an outdoor unit 21b.

The outdoor unit 21b may include a compressor 102b serving to compress a refrigerant, a compressor motor 102bb for driving the compressor, an outdoor heat exchanger 104b for driving to dissipate the compressed refrigerant, an outdoor fan 105b including an outdoor fan 105ab which is disposed in one side of the outdoor heat exchanger 104b and accelerates the heat dissipation of the refrigerant and an electric motor 105bb which rotates the outdoor fan 105ab, an expansion mechanism 106b for expanding the condensed refrigerant, a cooling/heating switching valve 110b for changing the flow path of the compressed refrigerant, and an accumulator 103b for temporarily storing the gasified refrigerant to remove water and foreign substances, and then supplying a refrigerant of a given pressure to the compressor.

The indoor unit 31b may include an indoor heat exchanger 108b which is disposed indoors and performs a cooling/heating function, and an indoor air blower 109b including an indoor fan 109ab which is disposed in one side of the indoor heat exchanger 108b and accelerates the heat dissipation of the refrigerant and an electric motor 109bb for which rotates the indoor fan 109ab.

At least one indoor heat exchanger 108b may be installed. At least one of an inverter compressor and a given speed compressor may be used as the compressor 102b.

Further, the air conditioner 100b may be implemented by a cooler for cooling the room, or a heat pump for cooling or heating the room.

The compressor 102b in the outdoor unit 21b of FIG. 11 may be driven by a power converting apparatus (motor driving apparatus), as shown in FIG. 3, which drives a compressor motor 230b.

Alternatively, the indoor fan 109ab or the outdoor fan 105bb may be driven by a power converting apparatus (motor driving apparatus), as shown in FIG. 3, which drives the indoor fan motor 109bb and the outdoor fan motor 105bb, respectively.

FIG. 12 is a schematic diagram illustrating a configuration of a refrigerator which is another example of a home appliance according to an embodiment of the present invention.

Referring to FIG. 12, a refrigerator 100c may include a compressor 112c, a condenser 116c for condensing the refrigerant compressed by the compressor 112c, a freezer compartment evaporator 124c provided in a freezer compartment (not shown) to receive and evaporate the refrigerant condensed in the condenser 116c, and a freezer compartment expansion valve 134c for expanding the refrigerant supplied to the freezer compartment evaporator 124c.

Meanwhile, in the drawing, it is illustrated that a single evaporator is used, but it is also possible to a separate evaporator in each of the refrigerating compartment and the freezer compartment.

That is, the refrigerator 100c may include a refrigerating compartment evaporator (not shown) disposed in a refrigerating compartment (not shown, a three-way valve (not shown) for supplying the refrigerant condensed in the condenser 116c to the refrigerating compartment evaporator (not shown) or the freezer compartment evaporator 124c, and a refrigerating compartment expansion valve (not shown) for expanding the refrigerant supplied to the refrigerating compartment evaporator (not shown).

In addition, the refrigerator 100c may further include a gas-liquid separator (not shown) which separates the refrigerant passed through the evaporator 124c into a liquid and a gas.

In addition, the refrigerator 100c may further include a refrigerating compartment fan (not shown) and a freezer compartment fan 144c that suck cold air passed through the freezer compartment evaporator 124c, and blow the sucked cold air to the refrigerating compartment (not shown) and the freezer compartment (not shown).

Further, the refrigerator may further include a compressor driving unit 113c for driving the compressor 112c, and a refrigerating compartment fan driving unit (not shown) and a freezer compartment fan driving unit 145c that drive the refrigerating compartment fan (not shown) and the freezer compartment fan 144c respectively.

Meanwhile, referring to the drawing, since a common evaporator 124c is used for the refrigerating compartment and the freezer compartment, in this case, a damper (not shown) may be installed between the refrigerating compartment and the freezer compartment, and a fan (not shown) may forcedly blow to supply the cold air generated by a single evaporator to the freezer compartment and the refrigerating compartment.

The compressor 112c of FIG. 12 may be driven by a power converting apparatus (motor driving apparatus), as shown in FIG. 3, which drives the compressor motor.

Alternatively, the refrigerating compartment fan (not shown) or the freezer compartment fan 144c may be driven by the power converting apparatus (motor driving apparatus), as shown in FIG. 3, which drives a refrigerating compartment fan motor (not shown), and a freezer compartment fan motor (not shown).

According to at least one of the embodiments of the present invention, an AC/DC combined home appliance can be provided.

According to at least one of the embodiments of the present invention, the load can be driven by automatically introducing the AC or DC power to the power supply unit. Further, by commonly using a power supply circuit to which the power is inputted, manufacturing cost can be reduced.

In addition, according to at least one of the embodiments of the present invention, a home appliance can be used through only a simple operation of connecting any one power plug to the home appliance and plugging it into an outlet, thereby improving usability.

In addition, according to at least one of the embodiments of the present invention, safety accidents due to the DC power polarity connection can be prevented.

In addition, according to at least one of the embodiments of the present invention, it can be used as an AC household appliance in an area where DC distribution is not spread and, even if DC distribution is spread since then, can be used as a DC household appliance without needing to replace a product.

The power converting apparatus and the home appliance having the power converting apparatus according to the present invention are not limited to the configuration and method of the embodiments described above, and the above embodiments may be implemented by selectively combining all or some of the embodiment so that various modifications can be achieved.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A power converting apparatus comprising:
  an input unit including an AC connection unit to receive an alternating current (AC) power and a DC connection unit to receive a direct current (DC) power;
  a bridge diode unit which always outputs the DC power having a given polarity when the DC power is received through the input unit, and rectifies the AC power to output DC power when the AC power is received through the input unit; and
  a capacitor which is coupled to a DC terminal which is an output terminal of the bridge diode unit,
  wherein the input unit comprises:
  an AC input detection unit configured to detect an input of the AC power;
  a DC input detection unit configured to detect an input of the DC power; and
  a relay configured to interrupt the input of the AC power received through the AC connection unit when both the AC power and the DC power are received in the input unit.

2. The power converting apparatus of claim 1, comprising a noise filter disposed between the input unit and the bridge diode unit.

3. The power converting apparatus of claim 1, wherein the relay is configured to interrupt a connection between the AC connection unit and the bridge diode unit when the DC input detection unit detects the input of the DC power.

4. The power converting apparatus of claim 1, comprising an inverter unit which is coupled to the DC terminal, to drive a motor.

5. The power converting apparatus of claim 1, comprising a voltage conversion unit which is coupled to the DC terminal to supply the DC power to at least one load.

6. The power converting apparatus of claim 1, wherein the AC connection unit is coupled to an AC plug and the DC connection unit is coupled to a DC plug, and the DC plug includes an arc extinction device.

7. The power converting apparatus of claim 1, wherein the bridge diode unit comprises:
a first diode which has an anode terminal coupled to a first terminal of the input unit;
a second diode which has a cathode terminal coupled to the first terminal of the input unit;
a third diode which has a cathode terminal coupled to a cathode terminal of the first diode and has an anode terminal coupled to a second terminal of the input unit; and
a fourth diode which has an anode terminal coupled to an anode terminal of the second diode and has a cathode terminal coupled to the second terminal of the input unit.

8. The power converting apparatus of claim 7, wherein an electrical circuit is formed through the first diode and the fourth diode when a positive polarity of the DC power is coupled to the first terminal and a negative polarity of the DC power is coupled to the second terminal.

9. The power converting apparatus of claim 7, wherein an electrical circuit is formed through the second diode and the third diode when a negative polarity of the DC power is coupled to the first terminal and a positive polarity of the DC power is coupled to the second terminal.

10. A home appliance comprising the power converting apparatus of claim 1.

11. A home appliance comprising:
an input unit including an AC connection unit to receive an alternating current (AC) power and a DC connection unit to receive a direct current (DC) power;
a bridge diode unit which always outputs the DC power having a given polarity when the DC power is received through the input unit, and rectifies the AC power to output DC power when the AC power is received through the input unit;
a capacitor which is coupled to a DC terminal which is an output terminal of the bridge diode unit;
a controller; and
an inverter unit which is coupled to the DC terminal, to drive a motor based on control from the controller,
wherein the input unit comprises:
an AC input detection unit configured to detect an input of the AC power;
a DC input detection unit configured to detect an input of the DC power; and
a relay configured to interrupt the input of the AC power received through the AC connection unit when both the AC power and the DC power are received in the input unit.

12. The home appliance of claim 11, comprising a voltage conversion unit which is coupled to the DC terminal to supply the DC power to at least one load.

13. The home appliance of claim 11, wherein the relay is configured to interrupt a connection between the AC connection unit and the bridge diode unit when the DC input detection unit detects the input of the DC power.

14. The home appliance of claim 11, comprising a noise filter disposed between the input unit and the bridge diode unit.

15. The home appliance of claim 11, wherein the AC connection unit is coupled to an AC plug and the DC connection unit is coupled to a DC plug, and the DC plug includes an arc extinction device.

16. The home appliance of claim 11, wherein the bridge diode unit comprises:
a first diode which has an anode terminal coupled to a first terminal of the input unit;
a second diode which has a cathode terminal coupled to the first terminal of the input unit;
a third diode which has a cathode terminal coupled to a cathode terminal of the first diode and has an anode terminal coupled to a second terminal of the input unit; and
a fourth diode which has an anode terminal coupled to an anode terminal of the second diode and has a cathode terminal coupled to the second terminal of the input unit.

* * * * *